(12) United States Patent
Barillot et al.

(10) Patent No.: US 6,927,528 B2
(45) Date of Patent: Aug. 9, 2005

(54) PIEZOACTIVE ACTUATOR WITH DAMPENED AMPLIFIED MOVEMENT

(75) Inventors: François Barillot, Grenoble (FR); Frank Claeyssen, Meylan (FR); Ronan Le Letty, Grenoble (FR)

(73) Assignee: Cedrat Technologies, Meylan (FR)

( * ) Notice: Subject to any disclaimer, the term of this patent is extended or adjusted under 35 U.S.C. 154(b) by 30 days.

(21) Appl. No.: 10/754,716

(22) Filed: Jan. 12, 2004

(65) Prior Publication Data

US 2004/0140737 A1 Jul. 22, 2004

(30) Foreign Application Priority Data

Jan. 17, 2003 (FR) .............................. 03 00491

(51) Int. Cl.⁷ .............................................. H01L 41/08
(52) U.S. Cl. ...................................... 310/325; 310/328
(58) Field of Search ................................ 310/325, 326, 310/328, 366, 337

(56) References Cited

U.S. PATENT DOCUMENTS

| | | | |
|---|---|---|---|
| 3,558,936 A | * | 1/1971 | Horan .................... 310/323.01 |
| 4,420,826 A | | 12/1983 | Marshall, Jr. et al. |
| 4,706,230 A | * | 11/1987 | Inoue et al. ................. 367/174 |
| 5,199,701 A | | 4/1993 | Shioya et al. |
| 5,291,461 A | | 3/1994 | Boeglin et al. |
| 5,431,058 A | | 7/1995 | Lagier et al. |
| 5,497,357 A | | 3/1996 | Dahlstrom et al. |
| 5,532,540 A | * | 7/1996 | Claeyssen et al. ..... 310/323.16 |
| 6,402,499 B1 | * | 6/2002 | Braungardt et al. ........ 425/432 |
| 6,465,936 B1 | | 10/2002 | Knowles et al. |
| 6,700,308 B2 | * | 3/2004 | Heinz ......................... 310/328 |

FOREIGN PATENT DOCUMENTS

| | | |
|---|---|---|
| EP | 0 363 032 A2 | 4/1990 |
| FR | 2 672 179 | 7/1992 |
| FR | 2 740 643 | 4/1997 |

OTHER PUBLICATIONS

Le Letty et al., "A New Amplified Piezoelectric Actuator for Precise Positioning and Active Damping," SPIE, vol. 3041, pp. 496–504, 1997.

* cited by examiner

Primary Examiner—Mark Budd
(74) Attorney, Agent, or Firm—Oliff & Berridge, PLC

(57) ABSTRACT

The piezoactive actuator with amplified movement comprises a first sub-assembly formed by a mechanical movement amplifier and a second sub-assembly equipped with piezoactive elements. An interface with a load and an interface with a base, respectively placed at the peaks of a small axis of the shell and designed for actuating the load with respect to the base, define an actuating axis. A longitudinal deformation of the large axis enables a deformation of the small axis to be induced, designed to generate a movement at the interface with the load, the component of which movement along the small axis is amplified. At least one zone made of elastomer material is arranged at least substantially along the actuating axis to dampen deformations and increase the capacity of the actuator to resist external stresses. The actuator comprises at least one free space adjacent to the elastomer material zones in a direction orthogonal to the actuating axis.

20 Claims, 8 Drawing Sheets

PIEZOACTIVE ACTUATOR WITH DAMPENED AMPLIFIED MOVEMENT

BACKGROUND OF THE INVENTION

The invention relates to a piezoactive actuator with amplified movement comprising:

a first sub-assembly formed by a mechanical movement amplifier arranged as a shell with at least two branches made of deformable flexible material, having a large axis and a small axis extending perpendicularly to one another, an interface with a load and an interface with a base, respectively placed at the peaks of the small axis of the shell and designed for actuating the load with respect to the base, defining an actuating axis, a second sub-assembly equipped with linear piezoactive elements mounted inside the shell in the direction of the large axis and electrically excited by a power supply circuit to produce a longitudinal deformation of the large axis and to induce a deformation of the small axis designed to generate at the interface with the load a movement the component whereof along the small axis is amplified.

STATE OF THE ART

A piezoactive actuator with amplified movement has been proposed in the document FR 2,740,276. In a general manner, an actuator is a device designed to perform actuating functions of a load fixed to one of its interfaces. These functions comprise movement, positioning or stabilization of the load.

Actuation of the load is performed by means of two actuating points, to which mechanical interfaces of the actuator correspond and which define the actuating axis. One of the actuating points is fixed to the load whereas the other point is fixed to a base acting as mechanical mass to counteract the reaction forces.

Actuation is performed by deformation of the actuator between the two actuating points. It takes place along at least one direction called the actuating direction, corresponding to a degree of freedom of the actuator.

In a more particular manner, the amplified actuator of the document FR 2,740,276 comprises a shell of approximately elliptic cross-section and one or more linear piezoelectric elements placed on a large axis of the shell. The actuator does not present a cover closing the two flanks of the shell.

In this actuator, the shell is used to perform mechanical preloading of the piezoactive elements. This shell also serves the purpose of producing an amplified movement in the direction of the small axis, i.e. the actuating direction, from an actuating point situated on one of the peaks of the small axis. The second actuating point is situated on the opposite peak of the small axis in the usual mode of use.

This actuator is able to provide two degrees of freedom in the case where the second actuating point is at the center of the actuator. In addition to main actuation on the direction of the small axis, a non amplified auxiliary movement is produced in the direction orthogonal to the small axis, in the main plane of the shell. This mode of use of the actuator requiring a central actuating point is constraining as it is not compatible with the previous one and does not enable all the deformation of the actuator to be recovered.

Amplified piezoelectric actuators can cause the problem of an insufficient resistance to dynamic external stresses and of an insufficient mechanical damping capacity. Amplified piezoelectric actuators do in fact sometimes show large quality factors: they can limit the resistance of the actuators under external dynamic stresses. It may therefore be useful to reduce the mechanical quality factor.

This is also the case for positioning. For example, with a stepped electrical excitation or when a stray vibration occurs at the base, movement of the actuator is stabilized with less oscillations the lower the quality factor. In applications aiming to use the actuator for damping or controlling structure vibration, it is also of interest to provide an actuator with a low quality factor.

Moreover, in the case of a shell with a high amplifying factor, the preloading level applied to the piezoactive elements must not exceed the elastic limit of the material of the shell. An auxiliary preloading device can be added on the shell to increase performances.

Several piezoactive component preloading devices are known to the man of the trade. They are mostly applied to direct piezoactive actuators. For example, the patent DE 19,650,900 proposes a spring formed by a steel wire presenting several spirals and placed in parallel with the piezoelectric component. It also proposes a bellows with revolution symmetry presenting spirals, inside which the piezoelectric component is placed. The stiffness of the spring or bellows and the adjustments of the shell enable preloading to be applied to the piezoelectric components.

A direct piezoactive actuator preloaded by means of one of the foregoing means and placed inside the mechanical amplifier presents two drawbacks:

the mechanical link between the preloaded direct piezoactive actuator and the mechanical amplifier has to withstand a high traction force equal to the preloading stress and leads to a bulky connection, this solution is hardly compatible with the possibility of controlling the degree of freedom in translation of the amplified piezoactive actuator.

Amplified piezoactive actuators wherein preloading of the piezoelectric component is performed by an auxiliary device already exist. For example, the document DE 19,625,921 describes an amplified electrostrictive actuator wherein preloading is performed by a spring acting on the small axis of the amplifier. When the amplifier has a high amplification ratio, the latter cannot transmit the preloading force to the piezoactive element with good efficiency.

An amplified piezoactive actuator wherein preloading of the piezoelectric component is performed with a cable made of a shape memory material is also known (marketed by Dynamic Structure Materials®). However, the cable stays are difficult to master, especially in small dimensions.

The presence of these additional means moreover has to take account of control of the actuator with several degrees of freedom.

OBJECT OF THE INVENTION

The object of the invention is to overcome these drawbacks and, more particularly, to improve the damping capacities of a piezoactive actuator and its resistance to dynamic external stresses.

According to the invention, this object is achieved by the fact that the actuator comprises, at least substantially along the actuating axis, at least one zone made of elastomer material designed to dampen deformations of the actuator and to increase the capacity of the actuator to resist external stresses, the actuator comprising at least one free space, adjacent to the elastomer material zone, in a direction orthogonal to the actuating axis.

According to a particular embodiment, the elastomer material zone is arranged between the piezoactive elements and the branches of the shell in the center of the shell, along the small axis.

According to another particular embodiment, the elastomer material zone completely fills the space between the piezoactive elements and the branches of the shell, the free space being arranged in the direction perpendicular to the plane defined by the small and large axes.

According to a development of the invention, the elastomer material zone presses in the center of the shell on a clearance take-up mechanism.

According to a particular embodiment, two elastomer material zones are arranged substantially parallel to the small axis, respectively on each side of the second sub-assembly, so as to join internal faces of the branches.

According to another particular embodiment, two elastomer material zones are arranged substantially parallel to the actuating axis, respectively on each side of the first and second sub-assemblies, so as to join the load and base.

According to another particular embodiment, at least two elastomer material zones are arranged substantially in the plane of the large and small axes, respectively between the shell and load and between the shell and base.

The elastomer material zone can be arranged outside the shell in contact with the branches of the shell and another body.

Three actuators can be arranged so as to form an isostatic mechanism with six degrees of freedom.

Four actuators can be arranged so as to form a mechanism with two degrees of freedom of rotation and one degree of freedom of translation, a mechanism with two degrees of freedom of translation or a mechanism with two degrees of freedom of translation and one degree of freedom of rotation.

The actuator can be arranged so as to dampen vibrations of a structure to which it is fixed.

BRIEF DESCRIPTION OF THE DRAWINGS

Other advantages and features will become more clearly apparent from the following description of particular embodiments of the invention given as non-restrictive examples only and illustrated in the accompanying drawings in which.

DESCRIPTION OF PARTICULAR EMBODIMENTS

Figure 1:
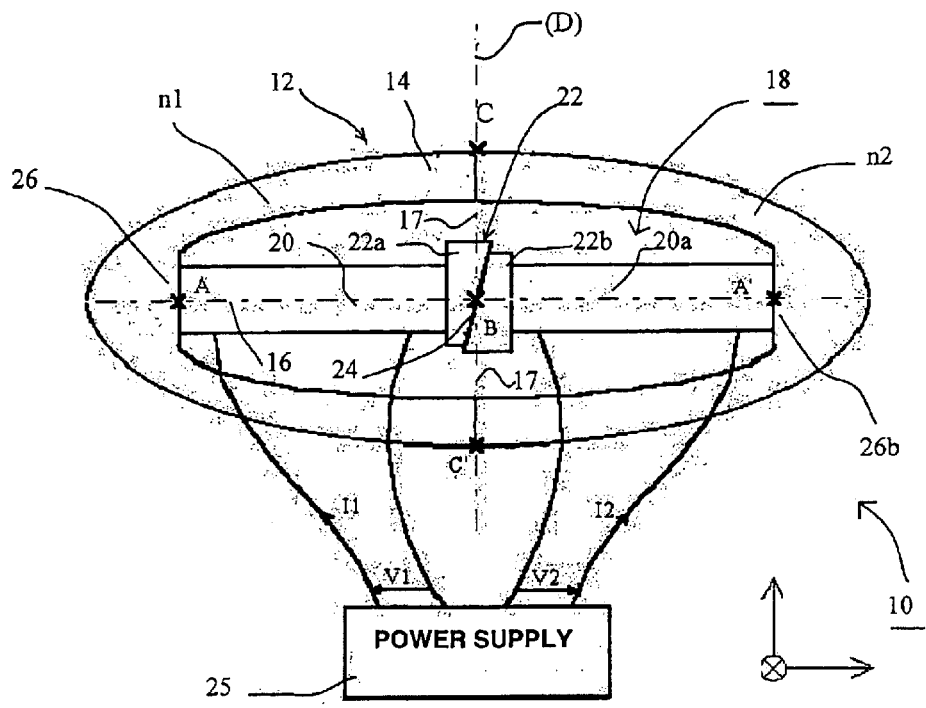
FIG. 1 presents an amplified piezoactive actuator according to the prior art, described in the document FR 2,740,276.

With reference to FIG. 1, the piezoactive actuator 10 comprises a first sub-assembly formed by a mechanical movement amplifier 14 arranged as a shell with two branches n1 and n2, each branch being approximately semi-elliptic, for example in the form of a symmetrical basket-handle. The mechanical amplifier 14 is formed by one or more deformable flexible materials, for example steel, aluminum or titanium alloy or a composite material, and is not provided with thinning zones.

The elliptic shell of the mechanical amplifier 14 has a large axis 16 extending in the x direction, and a small axis 17 perpendicular to the large axis 16 and extending in the z direction.

The second sub-assembly 18 includes piezoactive elements 20, 20*a* and possibly a clearance take-up device 22, arranged jointly inside the mechanical amplifier 14.

The piezoactive elements 20, 20*a* are formed by straight rods aligned in the direction of the large axis 16 inside the shell and able to be subjected to a change of length by application of an electrical excitation. Their base is formed by piezoelectric, magnetostrictive or electrostrictive material.

The two sub-assemblies 12 and 18 are connected to opposite joining points A and A', the length of the second sub-assembly 18 being adjusted if necessary to the available space by the clearance take-up device 22 that operates when the actuator 10 is fitted.

In the example of FIG. 1, the clearance take-up device 22 is located in the central zone between the two piezoactive elements 20, 20*a*.

In the usual operating mode, the actuating points for the load and fixed base are respectively the points C and C' located at the peaks of the small axis 17. The line passing through these points C and C' forms the actuating axis D. Power supply of the piezoactive materials 20, 20*a* causes deformation thereof along the large axis 16 which produces a relative movement of the point C with respect to C' with an amplified travel with respect to those of piezoactive materials. Travel of the point C takes place in the actuating axis D.

Figure 2:
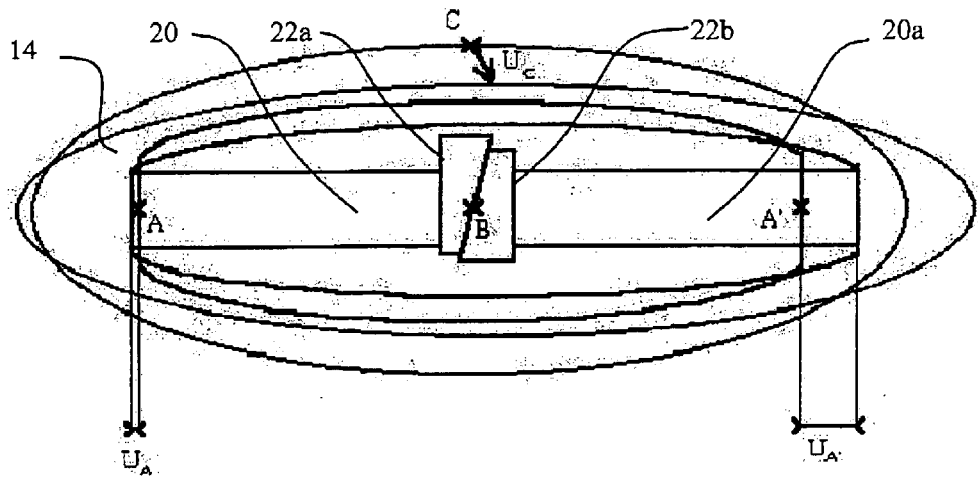
FIG. 2 presents an amplified piezoactive actuator with two degrees of freedom according to the prior art, described in the document FR 2,740,276.

FIG. 2 represents the operating mode of the actuator of FIG. 1, with a movement with two degrees of freedom. The system is then fixed to the center B of the actuator, from a member of clearance take-up device 22.

Electrical excitation of the two piezoactive elements 20, 20*a* is performed by means of a power supply circuit 25 with two independent channels, each channel being able to apply a voltage signal V1, V2 to command the piezoactive elements 20, 20a. The direction of movement of the point C of the shell of amplifier 14 depends on the nature of the voltage signals applied to the rods, for example following phase or amplitude adjustment.

To reduce the sometimes large quality factor of amplified piezoelectric actuators, it may be advantageous to use a damping material in combination with the amplifying mechanism. An elastomer or polymer material presenting a viscoelastic behavior can for example be used, i.e. a material presenting both a low Young's modulus and a high damping factor. By acting so as to cause deformations of the elastomer in the z direction, a damping effect is obtained linked to the mechanical losses associated to the deformation along this z axis. If the elastomer is free to deform in a direction x orthogonal to the forced deformation axis z, it will also be deformed along this x axis by Poisson effect, which is important in elastomer materials. These deformations induced along the x axis produce an additional damping effect to that produced by the deformation along the z axis. If on the contrary the elastomer is not free to deform in at least a direction orthogonal to the z axis, for example because of walls, these additional damping effects are not produced. In addition, the apparent stiffness along the z axis is increased. In an actuator, this increased stiffness tends to reduce the travel of the actuator in static mode, which is not desirable. In an actuator, it is therefore important to optimize the use of the elastomer material, to leave it a mechanically free direction.

Figure 3:
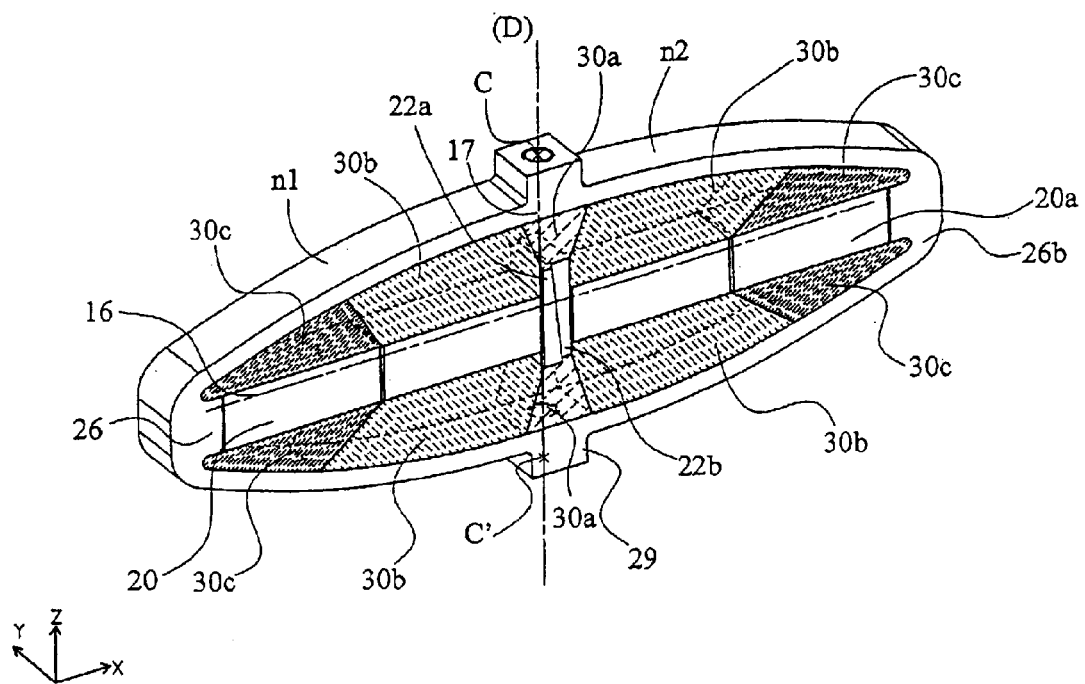
FIGS. 3 to 6 represent four particular embodiments of an actuator according to the invention.

In FIG. 3, an interface 28 with the load L1 and an interface 29 with the base L2, respectively placed at the peaks C, C' of the small axis of the shell and designed to actuate load L1 with respect to base L2, define an actuating axis D.

The piezoactive actuator according to the invention comprises, at least substantially along the actuating axis D, at least one elastomer material zone designed to dampen deformations of the actuator 10 and to increase the capacity of the actuator to resist external forces, the actuator comprising at least one free space adjacent to the zone made of elastomer material, in a direction orthogonal to the actuating axis D.

A damping means of piezoelectric structures with a substantially elliptic shell is known to the man of the trade. For example, in the document EP 0,363,032 relating to sonar flextensional piezoelectric transducers for underwater applications, the problem arises of resisting hydrostatic pressure in the case of deep immersion. To compensate the static pressure effects exerted on the whole surface of the shell and on the covers closing the two sides of the shell, this transducer uses a Helmholtz fluid cavity placed inside the transducer and connected to the external fluid medium by channels passing through the transducer covers. This cavity is filled either with water or with elastomers, which provides the additional advantage of damping the resonance of the Helmholtz resonator mode. The increased weight due to the elastomer is not at all penalizing as the system is immersed. Complete filling of a Helmholtz cavity internal to the transducer by an elastomer is well suited to an immersed transducer the object whereof is to produce acoustic energy by means of the surface of its shell.

On the contrary, in an actuator, in order not to increase its total weight and not to decrease its response time, it is important to place elastomer only in special areas where its damping properties will be used in optimum manner in combination with its actuating forces. In addition, to enable optimum use of the elastomer for damping, on account of their high Poisson's ratio, it is important to leave it at least one of the three free directions, enabling it to extend in this direction when stresses occur in one or the other of the directions that are not free. From the point of view of simplicity of achievement of these elastomer zones, it is moreover opportune to place them in more accessible zones to reduce the manufacturing costs.

A first method consists in placing two parts 30a of elastomer or polymer material along the small axis 17 of the shell, represented in FIG. 3. In this case, the piezoelectric actuator amplified in operation compresses or elongates the damping material in the actuating direction 17, between the points C and C' placed on the interfaces 28 and 29. The elastomer material is free to deform by Poisson effect in the two directions perpendicular to the small axis 17, enabling the maximum damping effect to be obtained from the elastomer. Moreover, between the points C and C', the deformation of the actuator is maximum and is much greater than the deformation between A, placed at the interface 26 between the shell and piezoactive element 20, and A', placed at the interface 26b between the shell and piezoactive element 20a. The use of the elastomer material 30a between C and C' therefore leads to an optimization in terms of the ratio of damping efficiency over volume of necessary material. It further enables the added weight to be limited, which is advantageous for the response time of the actuator. In a general manner, the elastomer material can extend to the zones 30b and 30c adjacent to the zone 30a and arranged between the branches of the shell and the piezoactive elements, bearing on the piezoactive elements 20, 20a. The elastomer material can occupy the complementary volume situated between the shell 12 and the actuating sub-assembly 18, it being noted that this volume remains open in the perpendicular direction leaving the elastomer this direction free to deform by Poisson effect and to dampen efficiently. Thus, the elastomer material zones 30a, 30b and 30c completely fill the space between the piezoactive elements 20, 20a and the branches n1, n2 of the shell, the free space being arranged in the direction perpendicular to the plane defined by the small axis 17 and the large axis 16.

In a preferred embodiment, the elastomer material is limited to the zone 30a along the small axis 17 and only bears on the clearance take-up shims 22a and 22b made of inactive materials, which means that the chemical compatibility and adhesion between the piezoactive materials and the elastomer materials does not have to be worried about.

Figure 4:
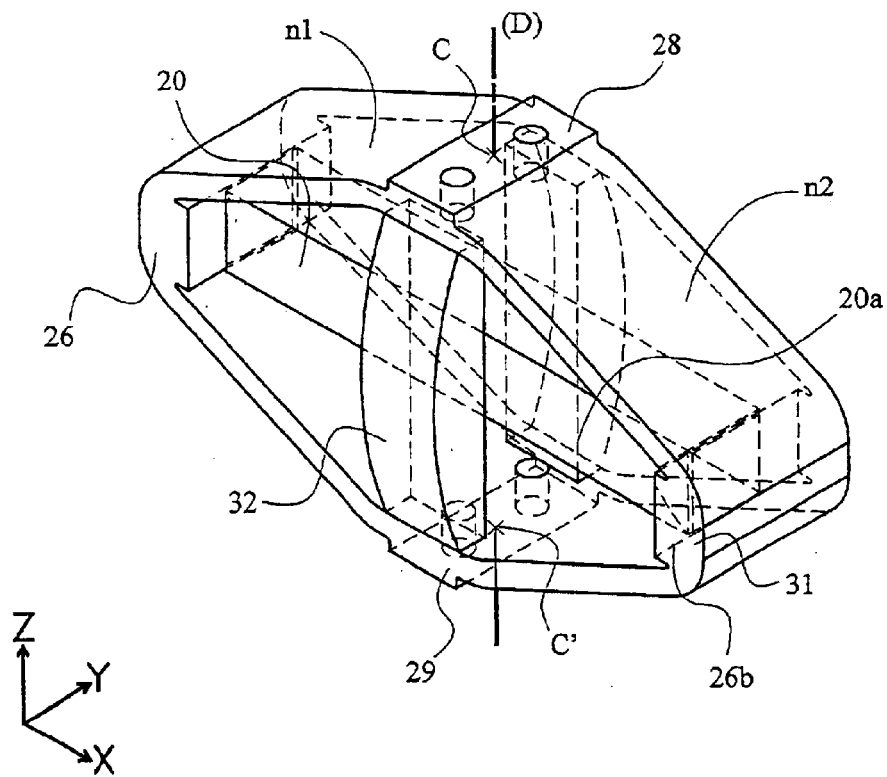

A second method consists in placing two symmetrical parts 32 made of elastomer or polymer material substantially parallel to the small axis 17 of the shell 31, as represented in FIG. 4, without pressing on the shims 22 or the active material 20. The two symmetrical parts 32 made of elastomer material are respectively arranged on each side of the second sub-assembly 18 so as to join the internal faces of the branches n1 and n2. As in the previous case, the piezoelectric actuator amplified in contraction operation along its small axis 17 compresses the damping material in the actuating direction 17, between the points C and C'.

Other methods consist in placing the damping material between the structure on which the actuator is fixed and the shell 31 of the actuator or between the shells of two adjacent actuators in the same mechanism, making the damping material act in the actuating direction of the actuator.

Figure 5:
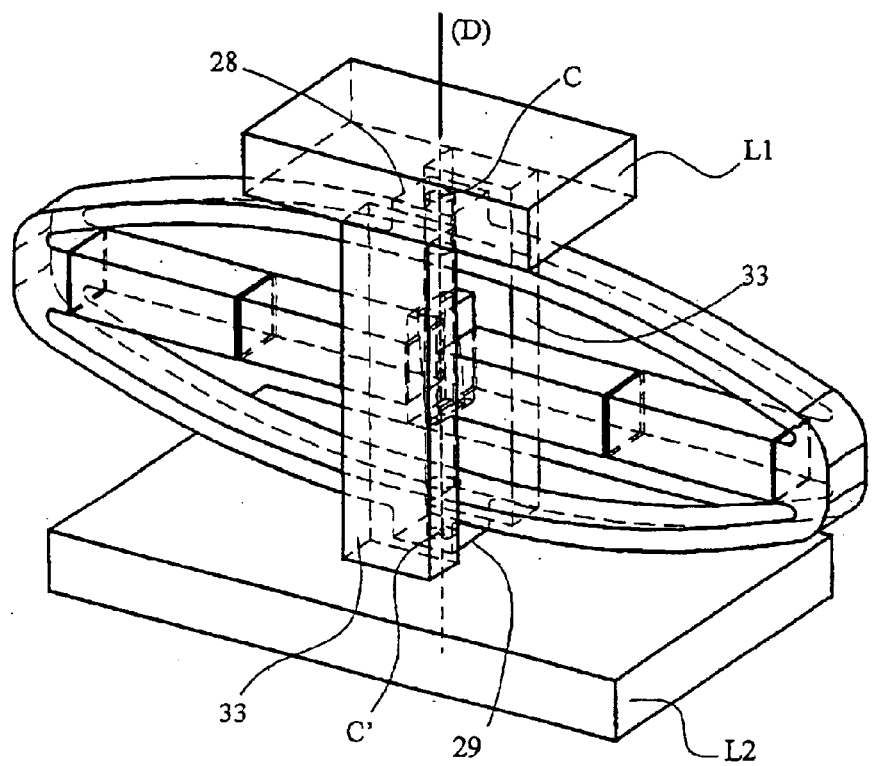

FIG. 5 presents a method of this type where the damping material 33 is implemented in the form of two parts 33 fixed substantially parallel to the actuating axis D, respectively on each side of the first 12 and second 18 sub-assemblies so as to connected the load L1 and base L2. The parts 33 are fixed irrespectively to the actuator, via the parts L1 and L2, which act as joining parts. In terms of damping, this configuration is practically identical to that of FIG. 4: the damping material is placed longitudinally in the actuating direction of the actuator. Its efficiency is therefore similar. It is obvious that the same effect would be obtained with a plurality of elements 33 placed in parallel.

Figure 6:
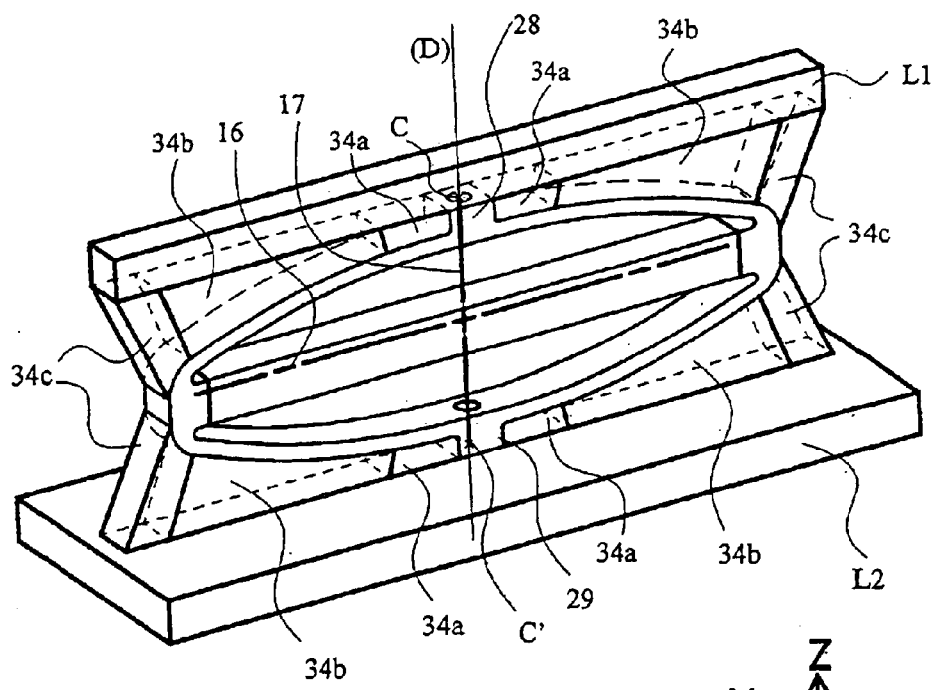

FIG. 6 presents another method of this type where the damping material is implemented in the form of twelve zones 34 of elastomer material arranged substantially in the plane of the large axis 16 and small axis 17, respectively between the shell 31 and load L1 and between the shell 31 and base L2. To limit costs, it is possible to limit the damping material to the zones 34a arranged along the actuating axis D, achieving it in the form of elastomer studs or rings overmolded along the interfaces 28, 29 of the actuator. To increase the ratio of efficiency over elastomer volume, it is preferable to place the damping material only in zones 34c at the ends of the shell 31. Furthermore the elastomer material can be arranged in intermediate zones, between the zones 34a and 34c. In terms of damping, this configuration is practically identical to those of FIGS. 3, 4 and 5: the damping material is placed longitudinally in the damping direction of the actuator. It is compressed when the actuator is compressed along its small axis 17. Its efficiency is therefore similar.

With one or the other of the embodiments presented in FIGS. 3 to 6, this results in an actuator presenting a quality factor of about five, which is therefore able to resist stresses of high level at frequencies close to the resonance frequency of the system formed by the actuator with its mechanical load.

It is obvious that the configurations of FIGS. 3 to 6 can be combined with one another to increase the damping capacity of the actuator.

Figure 7:
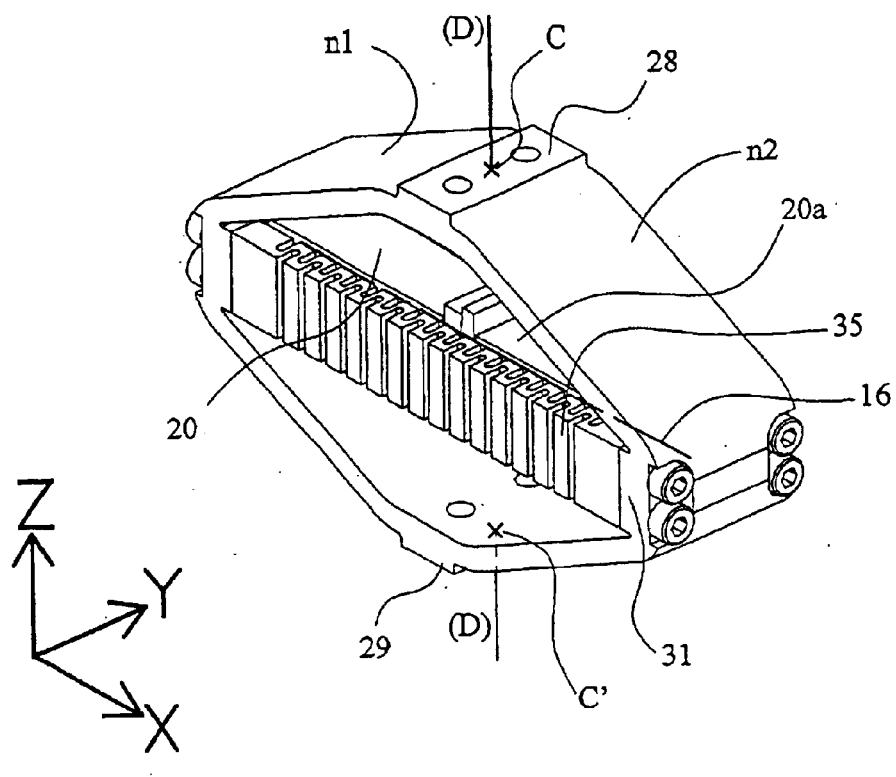
FIG. 7 represents an amplified piezoactive actuator comprising an additional preloading device.

To increase the capacity of the actuator to resist higher external stresses, the preloading of the piezoelectric components can also be increased. This preloading is normally performed by the actuator shell 31, but its value is limited in practice by the elastic limit of the material of the shell 31. It may therefore be advantageous to add an additional preloading device 35 arranged in parallel to the large axis 16 of the actuator so as to increase the capacity of the actuator to resist external stresses. FIG. 7 represents an actuator with an additional preloading device 35. To use such a system, the use of an extruded shell 31 is particularly useful. Thus, two springs can be connected to the shell 31 along its large axis to increase the preloading on the piezoactive components.

The improvements mentioned above remain compatible with the ability of an amplified piezoactive actuator to generate a second degree of freedom in a direction of the large axis of the amplifying shell 31.

Figure 8:
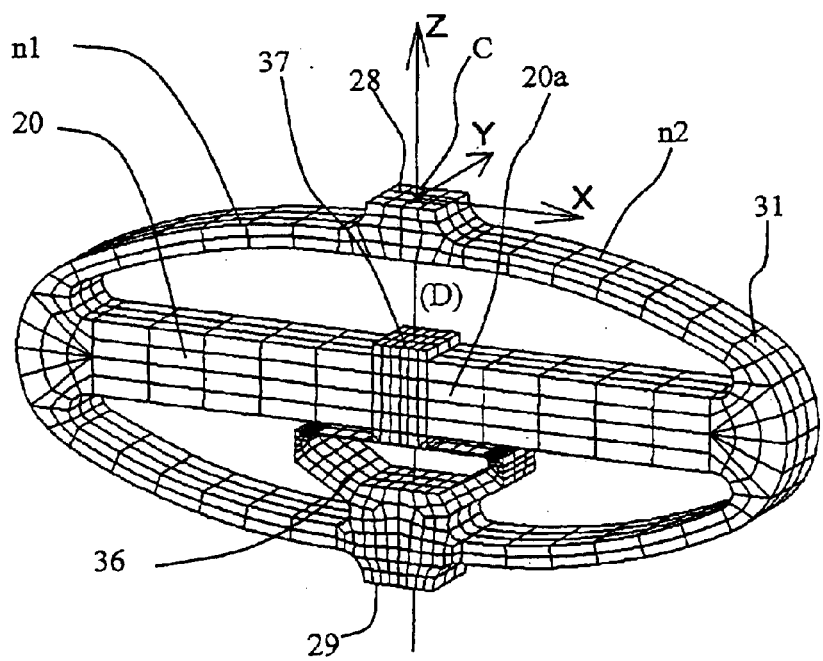
FIG. 8 represents an amplified piezoactive actuator providing two degrees of freedom.

It is thus possible to design an amplified piezoactive actuator generating two degrees of freedom, with actuating points situated at the peaks C on the interface 28 and C' on the interface 29 of the small axis 17. For this, it is important for the center of the actuator to be free to move along the small axis 17 of the actuator, but to be blocked in the direction of its large axis 16. This possibility is compatible with the previously described damping system. An actuator providing two degrees of freedom, comprising a mechanical device 36 acting at the center 37 of the actuator allowing a movement of the center of the actuator in the direction Z perpendicular to the actuator and preventing a movement in the direction X tangential to the actuator, is represented in FIG. 8. For example, the mechanical device can comprise two flexible blades arranged in a parallel direction to the large axis of the actuator linking the base of the actuator on the one hand and the center of the actuator on the other hand. Two actuating directions along the X and Z axes are obtained at the level of the actuating point C with respect to the point C', by adjusting the voltage signals applied to the rods 20 and 20a, for example on their amplitudes and phases.

Furthermore, it can be noted that the possibility for the center of the actuator to move on the one hand along the small axis 17 of the actuator, and to be prevented from moving along its large axis 16, is compatible with the previously described parallel preloading system. An actuator with an additional preloading device 35 formed by springs 38 connected to the center 37 of the actuator and comprising a mechanical device 36 acting in the center of the actuator, is represented in FIG. 9.

Figure 9:
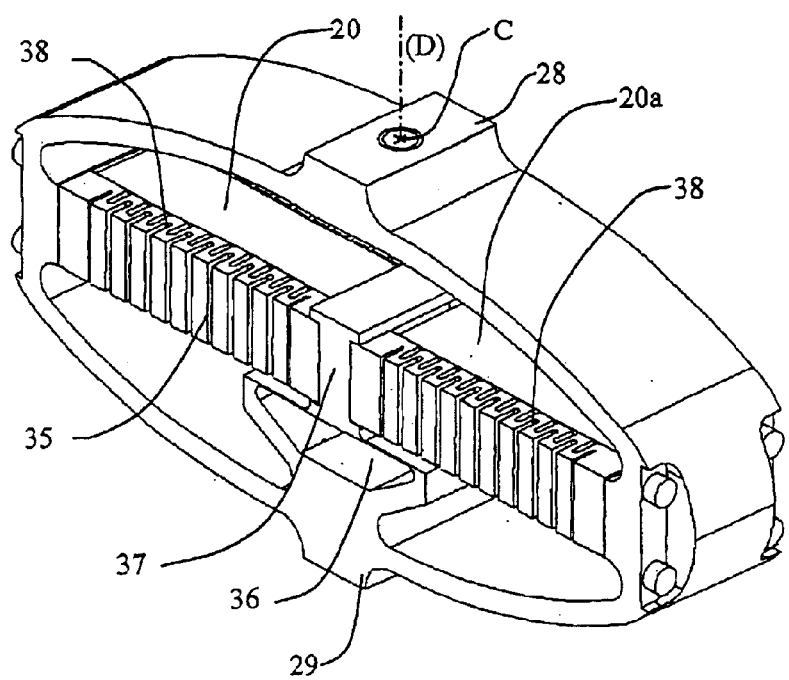
FIG. 9 represents an amplified piezoactive actuator providing two degrees of freedom and comprising a parallel additional preloading system.

The structure of the actuators of FIGS. 8 and 9 is also compatible with the presence of elastomer parts as described for FIGS. 3 to 6, and enables the actuator to be dampened in its two actuating directions. Elastomer parts are then expansion compression stressed for actuation along Z and shear stressed for actuation along X.

Figure 10:
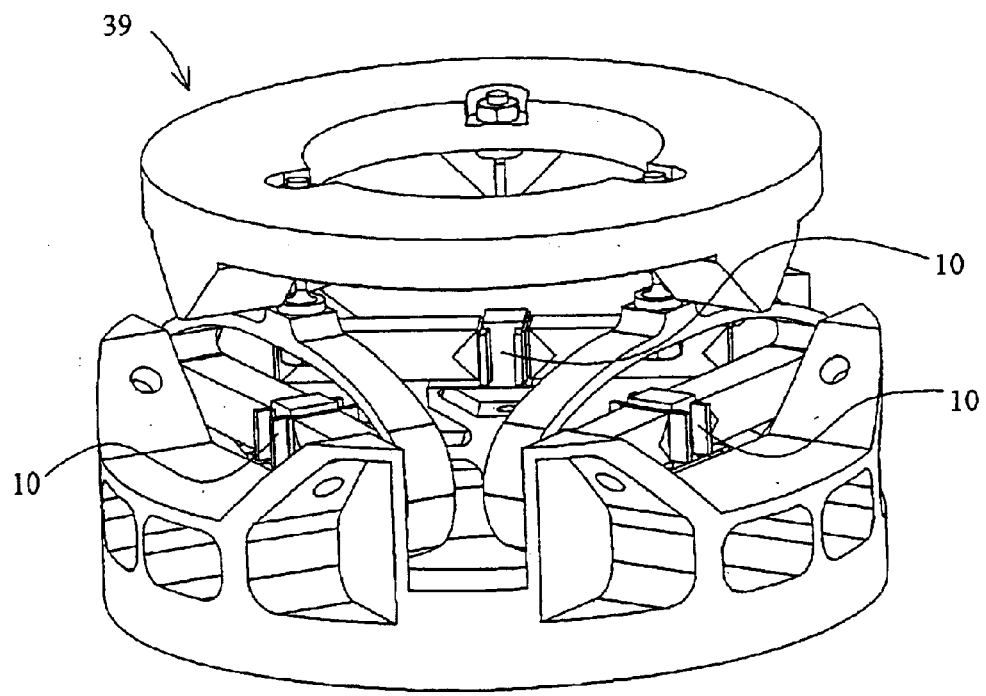
FIG. 10 represents a perspective view of a positioning actuator providing six degrees of freedom by means of three amplified piezoactive actuators with two degrees of freedom.

The improvements described above are compatible with the arrangement of several actuators to form mechanisms with several degrees of freedom. Thus, three actuators arranged as a tripod can form an actuator with three degrees of freedom. With reference to FIG. 10, three actuators 10 with two degrees of freedom arranged as a tripod can form a mechanism 39 with six degrees of freedom. These arrangements have the advantage of forming isostatic mechanisms, particularly advantageous in the optics field. For such devices, it is in fact particularly important not to deform the mirror. It is however necessary to place decoupling pivots between the amplified piezoelectric actuators and the mirror holder.

Figure 11:
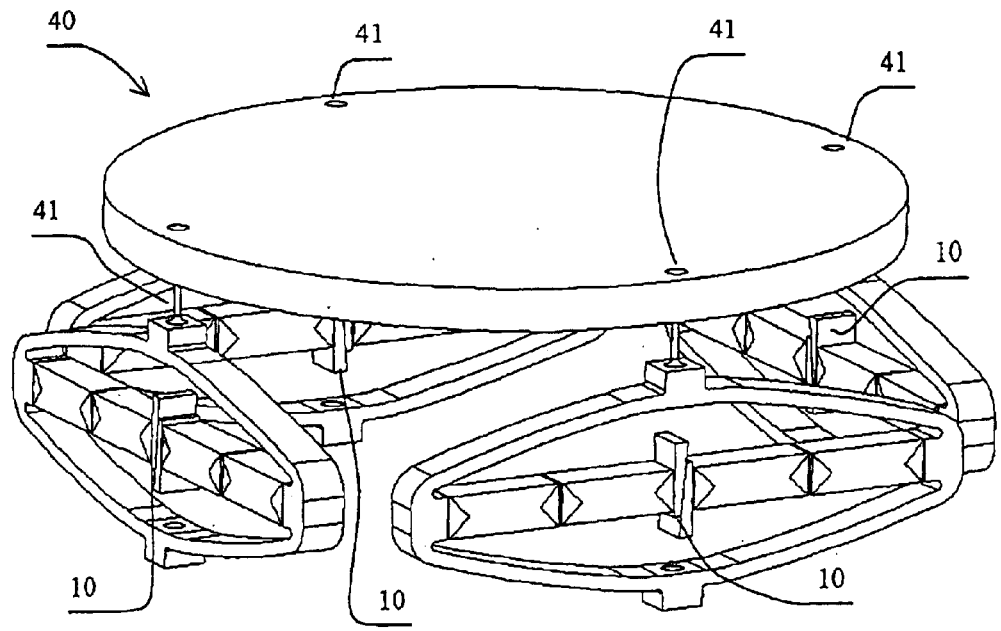
FIG. 11 represents a perspective view of a positioning actuator providing three degrees of freedom by means of four amplified piezoactive actuators, in which the flexion pivots are stuck in the actuators.
Figure 12:
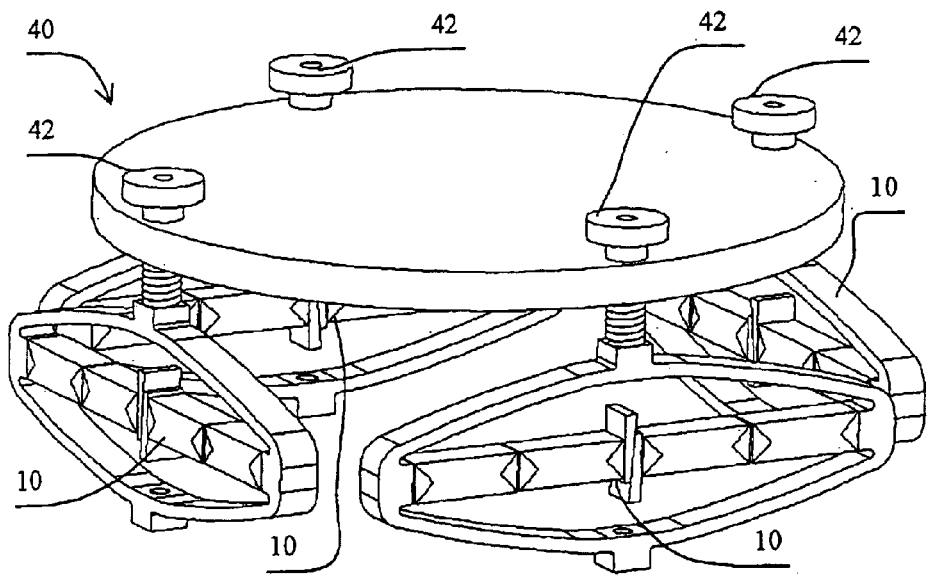
FIG. 12 is a perspective view of a positioning actuator providing three degrees of freedom by means of four amplified piezoactive actuators, in which the actuators are connected to a mobile platform by means of spring-loaded screws.

FIGS. 11 and 12 represent mechanisms 40 providing two degrees of rotation and one degree of translation by means of four actuators 10. The problem of static indeterminacy can then be solved in several ways aiming to obtain four flexible links of the same length. With reference to FIG. 11, in a first arrangement, the link 41 between the pivot and amplified piezoelectric actuator can be stuck. An alternative solution, represented in FIG. 12, consists in connecting the actuators to the mirror-holder by means of spring-loaded screws 42 (Prony screws).

Figure 13:
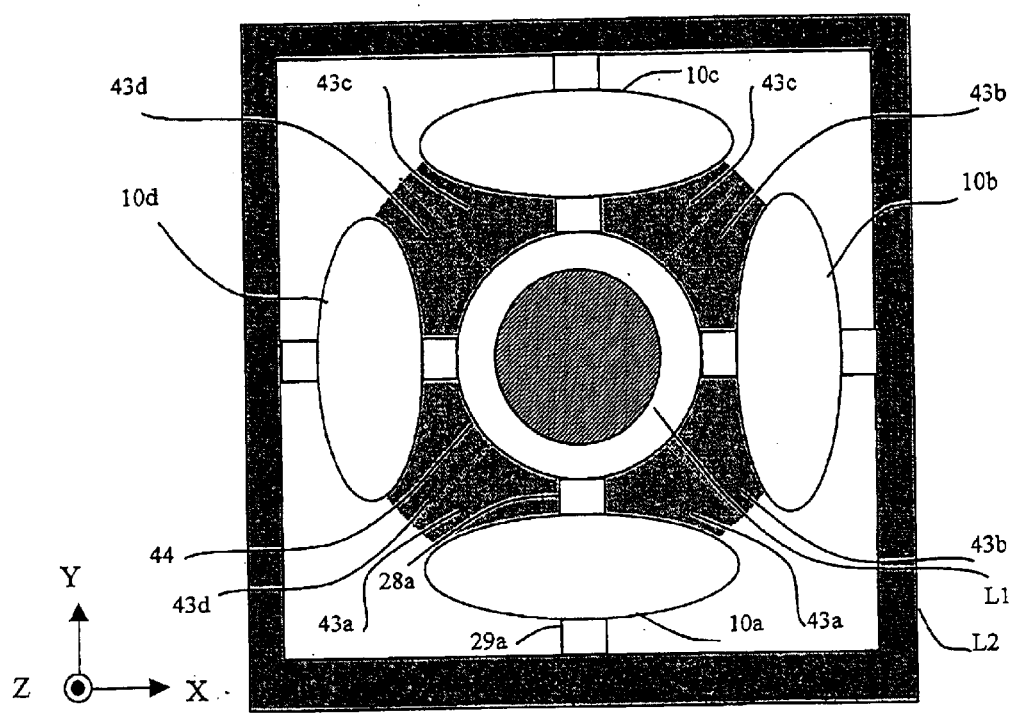
FIG. 13 represents a positioning actuator providing two degrees of freedom, dampened on a base with four amplified piezoelectric actuators.

FIG. 13 presents an actuator with two degrees of translation by means of four actuators 10. The mechanical interface 44 enables the interfaces 28 of the actuators 10 to be fixed to one another and the mechanical load L1 to be fixed. This mechanical interface can be hollow to place an optic lens therein and let light pass. The push-pull configuration of the actuators 10 enables an actuator to be achieved that is thermally compensated and mechanically centered with respect to the actuating directions X and Y. The elastomer zone 43, arranged substantially in the plane of the small and large axes of the actuators 10, between the actuators 10 and mechanical interface 44, can be achieved by overmolding. Each portion of elastomer 43a dampens the corresponding actuator 10a in a similar manner to the configuration described in FIG. 6, and respectively for the portions 43b, 43c, 43d with the actuators 10b, 10c, 10d. As in the configuration of FIG. 6, elastomer can also be placed (not represented) between the shell 31 of the actuator 10 and the frame fixed to the interface 29, this frame acting as fixed base L2.

Figure 14:
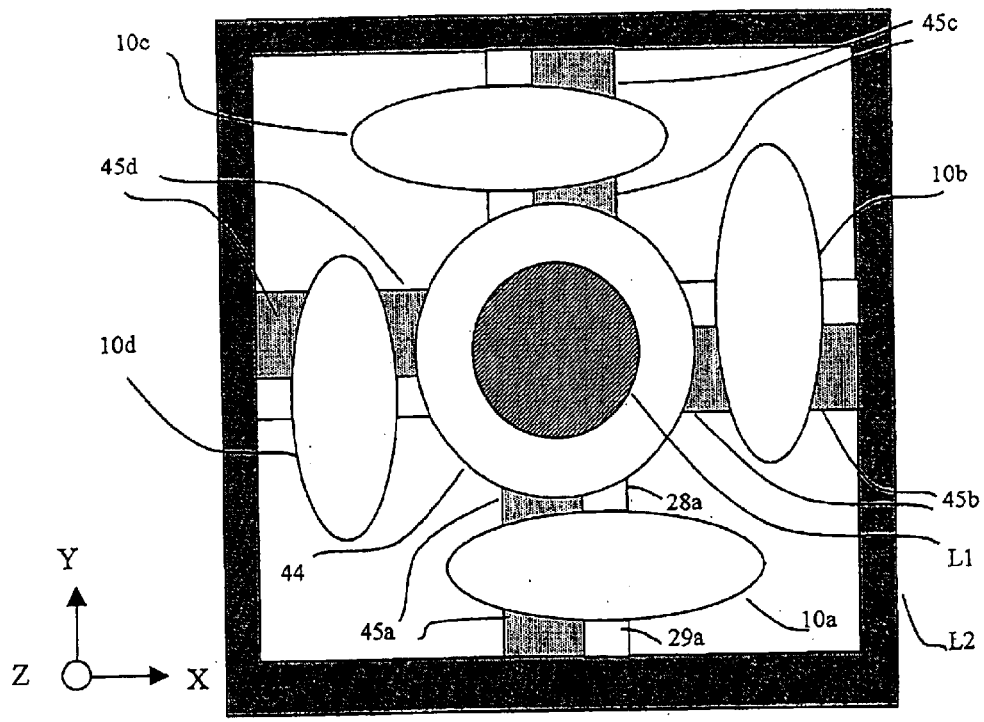
FIG. 14 represents a positioning actuator providing three degrees of freedom, dampened on a base with four amplified piezoelectric actuators.

In the configuration represented in FIG. 14, the actuating directions of two opposite actuators 10a and 10c, and 10b and 10d are parallel and separated by the same distance. They enable a limited rotation movement of the mechanical interface 44 to be generated around the Z axis, for example when the actuators 10 are all supplied so as to produce an identical movement. When the movement of each actuator of a pair 10a, 10c or 10b, 10d is opposite, a linear movement along X or Y is obtained. In this configuration, the elastomer parts 45a, 45b, 45c and 45d are placed along the actuating directions of each actuator 10a, 10b, 10c, 10d to dampen its actuators and thereby the whole of the mechanism.

The mechanisms of FIGS. 10 to 14 and any other mechanism can benefit from damping materials placed inside the actuators as described with reference to FIGS. 3 to 6, but also from damping materials acting in relation with the shell 31 of the actuators 10. This case is illustrated in FIG. 13 where the damping materials 43 are placed between the shell 31 of the actuators 10 and the interface 44 bearing the load or between two adjacent actuators 10.

Figure 15:
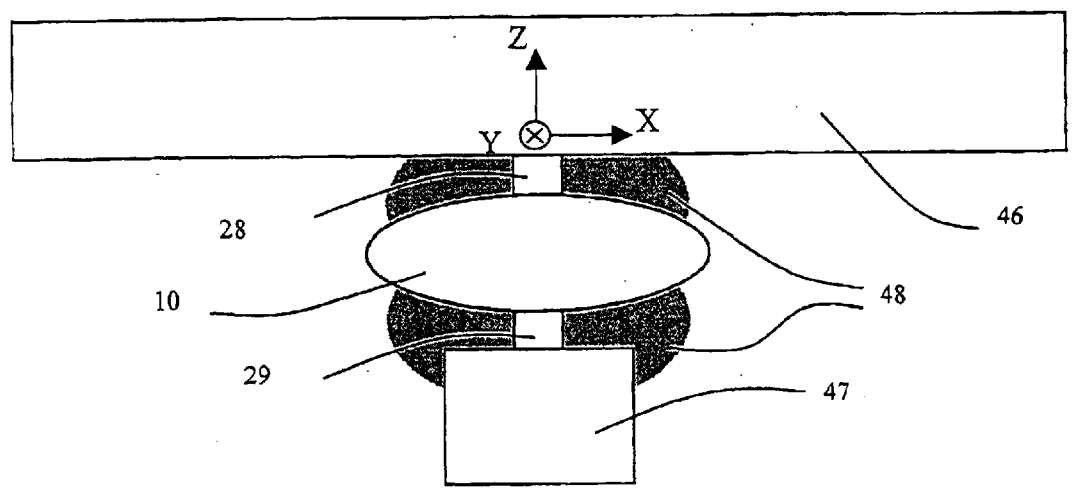
FIG. 15 represents a particular embodiment of a piezoelectric actuator comprising an inertia mass.

FIG. 15 illustrates an application of the actuators as structure vibration damper. The actuator 10 is fixed between the structure to be dampened 46, acting as load L1, and an inertia mass 47 acting as base L2. The damping material 48 can be placed outside the shell 31, or failing this be placed inside the shell 31 of the actuators as described in FIGS. 3 to 6. The actuator 10 can be an actuator with two degrees of freedom as described above in FIGS. 8 or 9 to control the vibrations of the structure 46 along the x and z axes.

What is claimed is:

1. Piezoactive actuator with amplified movement comprising a first sub-assembly formed by a mechanical movement amplifier arranged as a shell with at least two branches made of deformable flexible material, having a large axis and a small axis extending perpendicularly to one another, an interface with a load and an interface with a base, respectively placed at the peaks of the small axis of the shell and designed for actuating the load with respect to the base, defining an actuating axis, and a second sub-assembly equipped with linear piezoactive elements mounted inside the shell in the direction of the large axis and electrically excited by a power supply circuit to produce a longitudinal deformation of the large axis and to induce a deformation of the small axis designed to generate at the interface with the load a movement the component whereof along the small axis is amplified, actuator comprising, at least substantially along the actuating axis, at least one zone made of elastomer material designed to dampen deformations of the actuator and to increase the capacity of the actuator to resist external stresses, the actuator comprising at least one free space, adjacent to the elastomer material zone, in a direction orthogonal to the actuating axis.

2. Piezoactive actuator according to claim 1, wherein the elastomer material zone is arranged between the piezoactive elements and the branches of the shell in the center of the shell, along the small axis.

3. Piezoactive actuator according to claim 2, wherein the elastomer material zone completely fills the space between the piezoactive elements and the branches of the shell, the free space being arranged in the direction perpendicular to the plane defined by the small and large axes.

4. Piezoactive actuator according to claim 2, wherein the elastomer material zone presses in the center of the shell on a clearance take-up mechanism.

5. Piezoactive actuator according to claim 1, wherein two elastomer material zones are arranged substantially parallel to the small axis, respectively on each side of the second sub-assembly, so as to join internal faces of the branches.

6. Piezoactive actuator according to claim 1, wherein two elastomer material zones are arranged substantially parallel to the actuating axis, respectively on each side of the first and second sub-assemblies, so as to join the load and base.

7. Piezoactive actuator according to claim 1, wherein at least two elastomer material zones are arranged substantially in the plane of the large and small axes, respectively between the shell and load and between the shell and base.

8. Piezoactive actuator according to claim 1, wherein the elastomer material zone is arranged outside the shell in contact with the branches of the shell and another body.

9. Piezoactive actuator according to claim 1, wherein the actuator comprises an additional preloading device arranged in parallel to the large axis of the actuator so as to increase the capacity of the actuator to resist external stresses.

10. Piezoactive actuator according to claim 9, wherein the additional preloading device comprises two springs.

11. Piezoactive actuator according to claim 1, comprising a mechanical device acting in the center of the actuator allowing a movement of the center of the actuator in a direction perpendicular to the actuator and preventing a movement in a direction tangential to the actuator so as to allow two degrees of freedom.

12. Piezoactive actuator according to claim 9, wherein the additional preloading device is also connected to the center of the actuator.

13. Piezoactive actuator according to claim 11, wherein the mechanical device comprises two flexible blades arranged parallel to the large axis of the actuator and linking the base of the actuator on the one hand and the center of the actuator on the other hand.

14. Piezoactive actuator according to claim 1, wherein three actuators are arranged so as to form an isostatic mechanism with six degrees of freedom.

15. Piezoactive actuator according to claim 1, wherein four actuators are arranged so as to form a mechanism with two degrees of freedom of rotation and one degree of freedom of translation.

16. Piezoactive actuator according to claim 15, wherein flexion pivots are stuck in the actuators so as to prevent static indeterminancy of the actuator.

17. Piezoactive actuator according to claim 15, wherein the actuators are connected to a mobile platform by means of spring-loaded screws so as to prevent static indeterminancy of the actuator.

18. Piezoactive actuator according to claim 1, wherein four actuators are arranged so as to form a mechanism with two degrees of freedom of translation.

19. Piezoactive actuator according to claim 1, wherein four actuators are arranged so as to form a mechanism with two degrees of freedom of translation and one degree of freedom of rotation.

20. Piezoactive actuator according to claim 1, arranged so as to dampen vibrations of a structure to which it is fixed.

* * * * *